United States Patent [19]

Nassir

[11] 4,453,323
[45] Jun. 12, 1984

[54] METHOD AND SYSTEM FOR RECOVERING ENERGY FROM HOT PRESSURIZED WASTE

[76] Inventor: Nicholas Nassir, 616 N. Hidalgo Ave., Alhambra, Calif. 91801

[21] Appl. No.: 314,676

[22] Filed: Oct. 26, 1981

Related U.S. Application Data

[62] Division of Ser. No. 50,103, Jun. 19, 1979, Pat. No. 4,335,738.

[51] Int. Cl.³ .............................................. F02C 3/10
[52] U.S. Cl. .................................. 60/39.182; 122/7 B; 502/42; 137/246.22
[58] Field of Search ................ 60/39.02, 39.18 B, 657; 122/7 B, 7 R; 252/411 R, 417; 137/246.22; 251/305, 306

[56] References Cited

U.S. PATENT DOCUMENTS

| | | | |
|---|---|---|---|
| 2,011,641 | 8/1935 | Kruse | 251/305 X |
| 3,401,124 | 9/1968 | Goulden | 252/417 |
| 3,532,620 | 10/1970 | Asmus et al. | 252/417 X |
| 3,855,788 | 12/1974 | Damratowski | 60/39.25 X |
| 3,946,752 | 3/1976 | Yamamoto | 251/305 X |
| 4,077,432 | 3/1978 | Herr | 137/246.22 X |

FOREIGN PATENT DOCUMENTS

| | | | |
|---|---|---|---|
| 699819 | 12/1940 | Fed. Rep. of Germany | 251/305 |
| 881436 | 11/1961 | United Kingdom | 251/305 |

*Primary Examiner*—Louis J. Casaregola
*Assistant Examiner*—Donald E. Stout
*Attorney, Agent, or Firm*—Sellers and Brace

[57] ABSTRACT

Disclosed is a method, a system and an improved butterfly valve usable therein for recovering energy from a continuous supply of hot pressurized particulate-laden flue gas. This gas is conducted to the atmosphere via a selected one of a plurality of ducts equipped with separate purgable butterfly cut-off valves each located upstream both from the point of gas disposal to the atmosphere and from separate energy recovery devices. Each duct has provision downstream from an associated cut-off valve for insertion of a slip blind crosswise of that duct after closure of the cut-off valve thereby permitting servicing operations on the energy recovery device deactivated by the closed valve or valves. One or more of the recovery devices is usable to supply operating power for components of the system or to other equipment.

12 Claims, 3 Drawing Figures

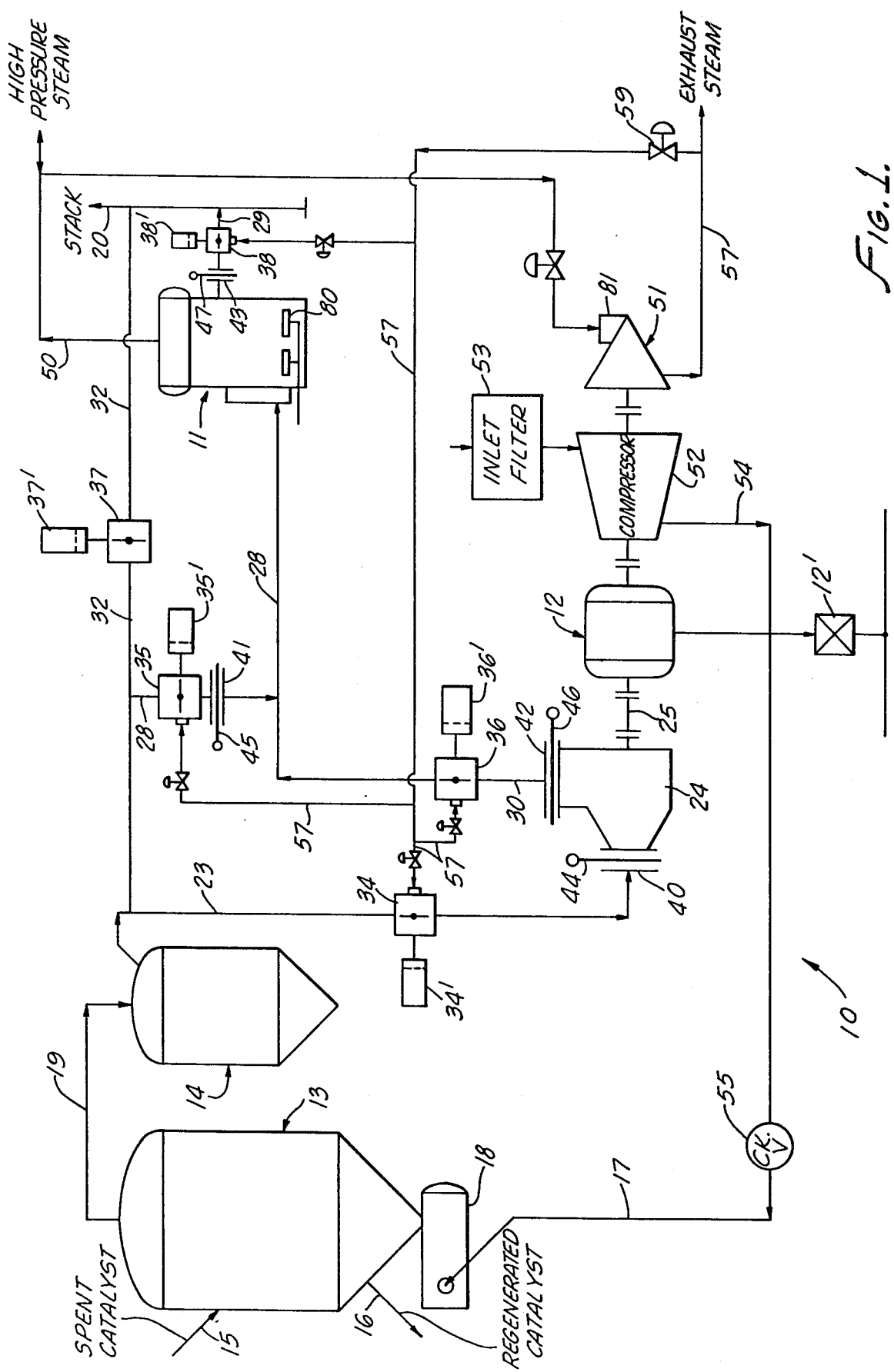

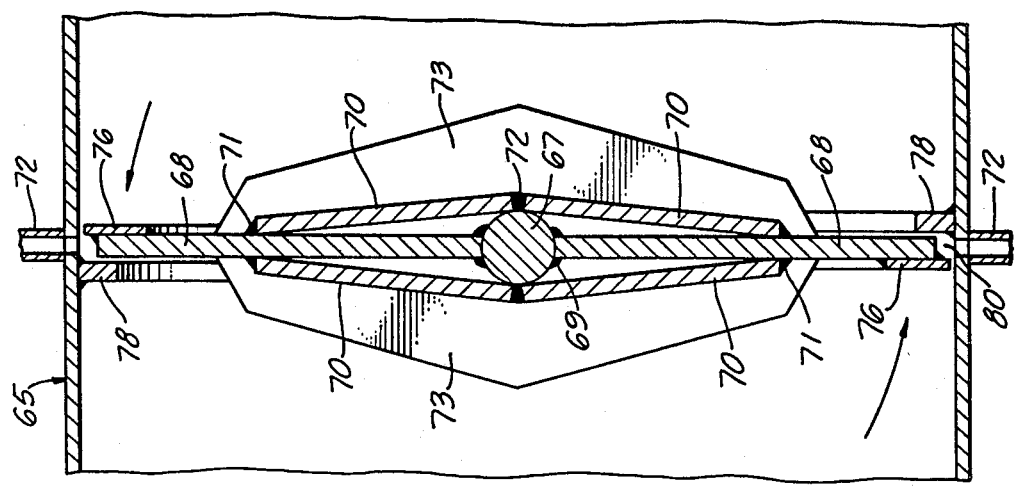
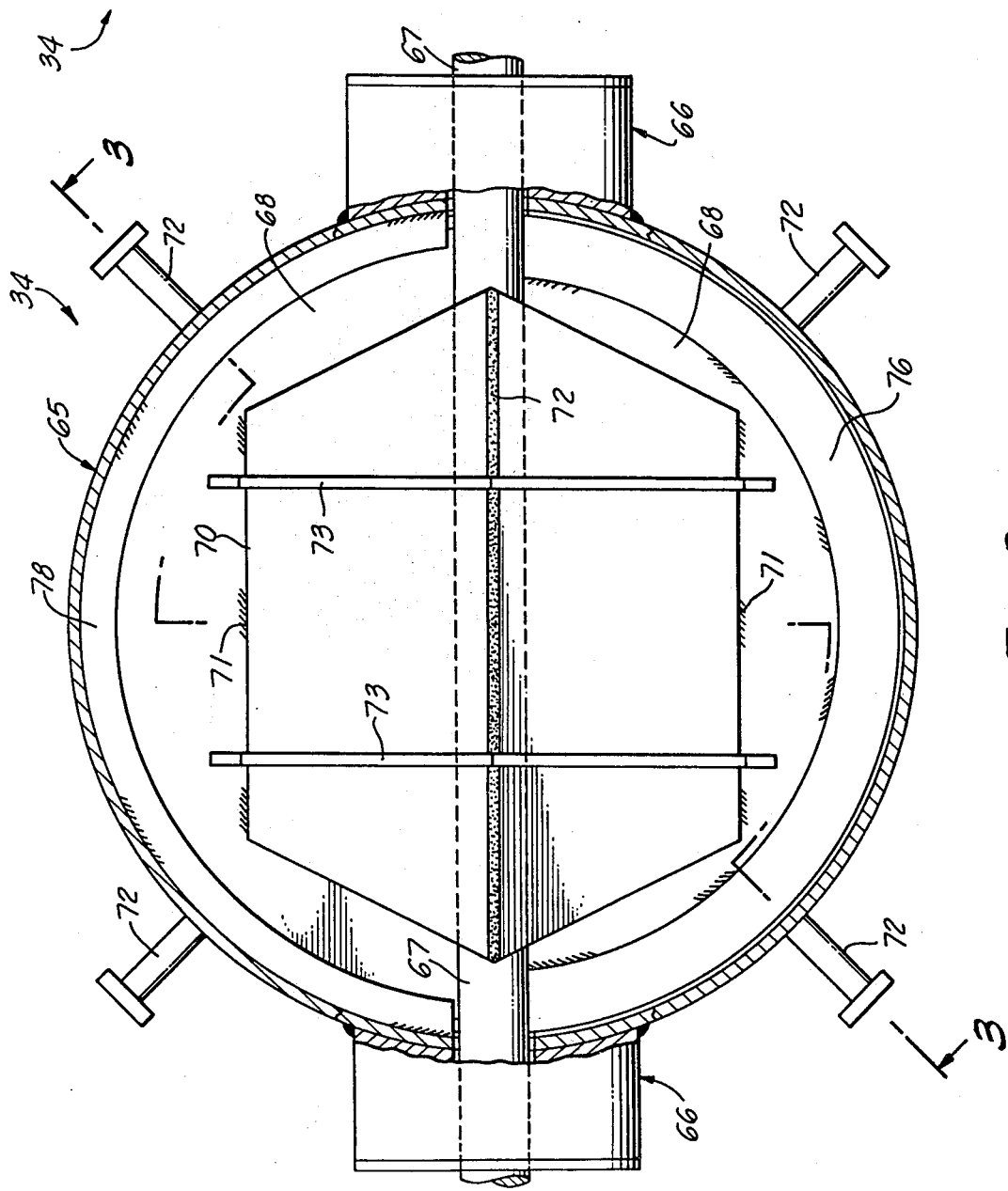

METHOD AND SYSTEM FOR RECOVERING ENERGY FROM HOT PRESSURIZED WASTE

This application is a division of my application for U.S. Letters Patent Ser. No. 050,103, now U.S. Pat. No. 4,335,738, filed June 19, 1979 having the same title as this application.

This invention relates to energy conservation equipment, and more particularly to unique and improved method and system for the recovery of energy from hot pressurized gases derived from a continuous source thereof without need for deactivating the gas source while conducting servicing operations on energy recovery components, and including provision of a unique cut-off valve essential to the operation of the system.

BACKGROUND OF THE INVENTION

The recovery of large quantities of energy present in large flow volumes of industrial flue gases laden with abrasive dust and fines, including gases from blast furnaces, coal gasification and petroleum refining equipment such as fluid catalytic cracking devices, present unresolved and challenging problems for energy conservation engineers. In these and the like operations, hot pressurized gases must be wasted to the atosphere on a continuous uninterrupted basis. Heretofore attempts to recover major portions of this energy have been unsuccessful owing to the fact that no satisfactory provision has been available for diverting the gas flow from recovery equipment to permit servicing operations without interrupting the operation of the continuous source of hot gases.

For example, a typical high volume source of hot gases comprises the waste gas output of a fluid catalytic cracking unit employed in a petroleum refining system. Typically, 150,000 actual cubic feet per minute of these flue gases are discharged at a pressure ranging between 30 and 40 psig, a temperature of 1,000° to 1,350° F. and are laden with abrasive contaminants including erosion producing particulates, and 5% to 10% of combustible carbon monoxide gas. The high energy content of such gases is readily recoverable in well known energy generating equipment such as a steam boiler, often called a CO boiler, rotary gas expanders and the like. However, such generators require deactivation and servicing at intervals but prior to this invention, it has not been practical to isolate them without shutting down the process unit for periods of up to ten days at an average loss of production amounting to hundreds of thousands of dollars and necessitating deactivating and reactivating all equipment associated with the production of the flue gases.

Various proposals hve been made for a cut-off valve for the hot gas intake to the power recovery components having a valve element and a cooperating seat capable of withstanding long exposure to extremely hostile conditions in the flow ducts and thereafter reliably cutting off the flow when there is need for servicing operations. Such prior proposals include valves of the type disclosed in the following U.S. Patents, Kinney et al U.S. Pat. No. 3,105,672; Bowman et al U.S. Pat. No. 3,532,321; Pease U.S. Pat. No. 3,620,242; Yamamoto U.S. Pat. No. 3,946,752; Raftis U.S. Pat. No. 3,749,115; Adams U.S. Pat. No. 4,003,394; Kitner U.S. Pat. No. 3,032,108 and Herr U.S. Pat. No. 4,077,432.

Each of these prior proposals is subject to serious shortcomings and is unreliable and unsatisfactory for energy conservation applications of the type herein contemplated. Some propose elastomeric sealing components between the valve member and the duct wall manifestly incapable of providing a seal under the pressure and temperature conditions typical of hot pressurized flue gases. Others propose a rotary plate valve disc designed to close against the duct wall when inclined acutely to a diametric plane through the duct and relying upon movably supported sealing components at the periphery of the disc to accommodate variation in construction tolerances, expansion of components, erosion of valve parts etc. In some instances the movable parts are flexible and in others the parts are shiftable in the plane of the valve member; all require fásteners in the assembly operation.

Operation of such valves is highly unreliable and undependable for various reasons. For example, fasteners are notoriously failure-prone owing to the prevailing high operating temperatures and the extremely severe erosion caused by the particulate laden gases. The heads of the fasteners frequently pop off and, if they do not, they are subject to rupture and shear failure when attempts are made to disassemble them for servicing. Certain designs employ pressurized gases supplied to the valve seat at a pressure adequate to block escape of the hot particulate laden gases past the valve when closed, the pressurizing gas being supplid through the tubular valve shaft. Such tubular shafts are objectionably large in diameter thereby seriously interfering with the flow of gases when the valve is open and have inadequate strength when the valve is closed. Some constructions endeavour to minimise these shortcomings by rifle-boring the shaft to permit use of smaller diameter shaft but this is a costly design and necessitates a higher pressure supply of the valve sealing gas. Still other proposals provide a pair of rectangular valves disposed side-by-side crosswise of a rectangular duct. Such a non-circular duct is highly undesirable under the high pressure, high temperature operating conditions typically present in energy recovery operations. Furthermore, a square or a rectangular valve inherently possesses very poor and inefficient seal properties along its lateral radial edges.

SUMMARY OF THE INVENTION

The invention energy recovery system provides a plurality of ducts leading from the source of hot gases to the point of disposal to the atmosphere at least two of which ducts contain separate selectively usable generators, such as a steam generator and an electrical generator driven by a flue gas expander. When this expander is being serviced the air compressor may be turbine-driven by steam produced in the steam generator or the induction generator normally driven by the expander may operate as a motor to drive the compressor, acting alone or in concert with the steam turbine. The upstream portion of each flue gas duct is equipped with one of the invention cut off valves and the downstream side of each of these valves is provided with a separable flanged connection which can be opened for installation of a conventional slip blind unit. Thereafter the associated downstream components can be disconnected or serviced. During component servicing, all flue gases can be routed through the other energy generator and thence to the atmosphere. Between servicing periods one only or both of the generators may be utilized.

This invention features a highly reliable, effective and efficient cut-off valve of simplified design of general utility in handling high temperature pressurized gases including, by way of example, each of a plurality of selectively usable ducts of a flue gas energy recovery system. This valve is of unique design and mode of operation both as respects the valve itself and as respects its location and mode of operation in an energy recovery system. This valve is of the buterfly type having a cylindrical main body and a circular valve disc mounted on a solid shaft. All movable components of the disc and shaft are permanently welded to one another without fasteners. One pair of diametrically opposed edges of the disc are L-shaped. The other diagonally opposed rim edges seat against a respective pair of semi-annular flanges commonly called stop seats extending inwardly from the main body. When the valve is closed the L-shaped periphery and the stop seat cooperate in providing an annular chamber for purging gas such as an inert gas or steam. The purging gas is injected at a pressure higher than the flue gas pressure to block escape of hot gases past the rim of the valve. Some degree of erosion, warpage, distortion and other irregularities in the sealing surfaces of any valve is unavoidable under the hostile operating conditions and the introduction of the higher pressure purging gas into the annular purging chamber avoids leakage of hot, toxic, and flammable gases which would otherwise occur. Purging gas for the cut-off valves may be supplied from the steam generator or from an inert gas supply.

Accordingly, it is a primary object of the invention to provide a unique apparatus and method for recovering energy from a continuous source of hot pressurized gas having provision for servicing components without interrupting operation of the gas source.

Another object of the invention is the provision of a system for recovering energy from hot pressurized flue gases before being wasted to the atmosphere utilizing one or more energy recovery devices selectively connectable in the flow path of the gases and including provision for isolating a recovery device in need of service while continuing the flow of flue gas through other flow passages of the system.

Another object of the invention is to provide a system for recovering energy from a continuous source of pressurized flue gas before being wasted to the atmosphere and utilizing portions of the recovered energy in the operation of the system components and including provision for isolating components while others remain in service.

Another object of the invention is the provision of a system for recovering energy from particulate-laden flue gas emanating from the fluid catalytic regenerator unit of a petroleum cracker without interrupting operation of said unit and including means for safely deactivating and servicing components of the system while others remain in use.

Another object of the invention is the provision of a system having a plurality of energy recovery devices connectable in the flow path of a continuous source of hot pressurized particulate-laden flue gas being wasted to the atmosphere and including unique purgable valves for selectively isolating any one of said energy recovery devices from the gas flow without interfering with the wasting of gs to the atmosphere.

Another object of the invention is the provision of an improved valve for cutting off the flow of hot pressurized particulate-laden gas notwithstanding eroded sealing surfaces, distortion, differential expansion and warpage of parts thereof.

Another object of the invention is the provision of a simplified, rugged highly reliable purgable cut-off valve for use in a high-temperature, high-pressure hostile environment.

Another object of the invention is the provision of an improved high-temperature, high-pressure butterfly valve the internal portions of which are devoid of fasteners and having a non-flexible valve disc and means for introducing purging fluid between the valve rim and the valve seat at a pressure higher than the fluid stream being cut off.

Another object of the invention is the provision of a butterfly valve having a solid shaft supporting a valve disc free of fluid passages and fasteners and provided between its rim and a cooperating seat with an annular chamber chargeable with pressurized purging fluid.

These and other more specific objects will appear upon reading the following specification and claims and upon considering in connection therewith the attached drawing to which they relate.

Referring now to the drawing in which a preferred embodiment of the invention is illustrated:

FIG. 1 is a diagramatic view of an illustrative embodiment of the invention energy recovery system in use to recover energy from the flue gas emanating from a fluid catalytic cracking unit of a petroleum refinery;

FIG. 2 is a partial cross-sectional view through one of the unique butterfly valves used in FIG. 1; and FIG. 3 is a cross-sectional view taken along the broken line 3—3 on FIG. 2.

Referring initially more particularly to FIG. 1, there is shown an energy recovery system, designated generally 10, utilizing a hot fluegas expander 24, a steam generator 11, an electrical generator 12 and a compressor 52 for recovering energy from a continuous source of hot pressurized flue gas. As herein shown by way of example, the continuous source of hot gas is a fluid catalytic crcking unit, the first two stages of particulates separation being in the regenerator vessel designated 13, and the final stage being in the third stage separator vessel designated 14. Such fluid catalytic cracking units are employed in the petroleum refining industry to regenerate catalysts employed in cracking petroleum. Spent catalyst from this operation enters the regenerator 13 via duct 15 and is returned to the cracking unit in known manner via duct 16. Pressurized air employed in the regenerating process is supplied through duct 17 and a start up heater 18.

Particulate laden gas exits from the top of regenerator 13 and passes along conduit 19 to the third stage separator 14 where smaller components of the particulate matter are separated in known manner by a multiplicity of cyclone separators, not shown, but well known in the industry. A suitable and preferred fluid dynamic separator is shown in my co-pending application for U.S. Letters Patent Ser. No. 30,025 filed Apr. 16, 1979 now abandoned. The hot particulate laden gases discharge from separator 14, have a temperature ranging between 1,000° and 1,350° F. and a pressure ranging between 30 and 40 psig, and a flow volume typically of the order of 150,000 actual cubic feet per minute. Heretofore when the hot gas expander 24 or the CO boiler 11 required inspection or maintenance, it was necessary to shut down the entire fluid catalytic cracking unit, insert the slip blinds to isolate the expander or boiler or unit in need of servicing. Such shutdown typically requires up to ten days, because these high temperature processes can only be cooled off or heated up very slowly and gradually. This shutdown typically causes production losses of hundreds of thousands of dollars. After installing isolating slip blinds, the operative portion of the system could be reactivated if warranted by a prolonged servicing operation. In this event it was necessary to shut down the system to permit removal of the slip blinds and then reactivating the entire system.

This invention provides a highly reliable high-efficiency means for avoiding this otherwise lost production by permitting the insertion of slip blinds without shutdown of the fluid catalytic cracking unit shown in FIG. 1.

The gas duct network includes three sets of ducts interconnecting the source of flue gas and the stack 20 through which the spent gases are wasted to the atmosphere. The first duct set for the normal operating mode includes ducts 23, 30, 28 and 29. The second duct set for the expander by-pass mode includes a portion of duct 32 and ducts 28, 29. A third duct set 32 by-passing both the expander and the steam generator, conducts all flue gas directly to stack 20 and is the set customarily used for start up operations.

Each of the hot gas ducts 23, 28, 29, 30, and 32 is provided with the high reliability butterfly type cut off valve, the details of which are shown in FIGS. 2 and 3 and will be described presently. These valves are designated 34, 35, 36, 37 and 38 and have their shafts operatively connected in suitable manner to a respective piston and cylinder 34', 35', 36', 37' and 38'. It will be observed that each of these valves is located in the upstream side of the gas duct from the particular component to be serviced following closure of the valve. It will also be noted that downstream from all except valves 37 and 38 is an associated flanged connection 40, 41, 42 and 43 any one of which can be opened after closure of the associated one of the purgeable butterfly vlaves. Thereafter a slip blind 44, 45, 46 and 47 may be securely installed to close off the side of the separated flange connected to the source of hot gas. This operation is of course carried out while the adjacent cut off valve is closed. As will become apparent below, some of the purging gas may still be escaping but in an amount insufficient to interfere with the installation of the slip blind but it is neither flammable nor toxic as is the CO gas that it displaces. Once the slip blind associated with the system component in need of service has been installed, the component may be serviced and detached if necessary.

The remaining components shown in FIG. 1 include a high pressure steam line 50 extending from generator 11 to the turbine 51 coupled to drive air compressor 52. The air enters this compressor through filter 53 and, exiting therefrom passes along the high pressure duct 54, through a check valve 55, to heater 18 and thence into the bottom of regenerating unit 13. As herein shown, the steam exhausting from turbine 51 is at a pressure higher than the pressure of the gas issuing from separator 14. Accordingly, this steam can be used as the purging fluid supplied to the periphery of any one of the cut off valves then in a closed position, or if desired, purging steam to the required pressure may be supplied to the purging chamber of these valves directly from an inert gas source. Steam issuing from the turbine is distributed to the periphery of each of the cut off valves by appropriate adjustment of valve 59. It will also be understood that, if desired, pressurized nitrogen or other inert gas, may be distributed to the purging chambers in lieu of steam.

Referring now to FIGS. 2 and 3, the structural details of a typical one of the purgeable butterfly valves, such as valve 34, will be described. This valve has a cylindrical main body 65 provided with bevelled ends, not shown, for separably welding it to one of the gas ducts. Main body 65 is provided diametrically thereof with a combined stuffing box and bearing assembly 66 of any suitable construction rotatably supporting a solid or boreless shaft 67. Identical semi-cylindrical discs 68, 68 lie in a common plane intersected by the axis of shaft 67 and are rigidly fused or wleded at 69 to the opposite sides of this shaft. Each disc and its connection to shaft 67 is rigidly reinforced as by pairs of plates 70, 70 welded to the opposite sides of shaft 67 and to the adjacent faces of discs 68, as is indicated by welds 71, 72. Additional and important reinforcing is provided by ribs 73 extending crosswise of shaft 67 and welded to plates 70 and discs 68 throughout their adjacent lines of contact.

The outer peripheries of discs 68 are spaced substantially inwardly of the inner surface of valve body 65. As herein shown, there is rigidly welded to the diagonally opposite radial surfaces of discs 68 a semi-annular closure bar 76 having its outer periphery spaced closely inwardly of the inner surface of main frame 65. It will therefore be apparent from FIG. 3 that this mode of attachment of closure bar 76 to disc 68 forms an L-shaped channel at the periphery of the valve. However, in lieu of closure bar 76 it will be understood that discs 68 may be machined to provide an equivalent annular channel.

As is best shown in FIG. 3, valve body 65 is provided with a pair of semi-annular inwardly projecting flanges or valve seats 78, 78 rigidly welded thereto. These valves seats lie in parallel planes spaced to either side of the axis of shaft 67 and in position to engage the adjacent face of disc 68 in the closed position of the valve. These seats also cooperate with the L-shaped channel about the periphery of the valve to form an annular purging fluid chamber 80 into which pressurized fluid is introduced from the exterior of the valve via at least one and, preferably, a plurality of pipes 72 mounted on and distributed about the periphery of the valve body. Each of the pipes 72 is connected to the pressurized purging fluid conduit 57.

From the foregoing it will be apparent that pressurized fluid introduced into purging chamber 80 from pipes 72 can escape through the very narrow gaps between the opposite faces of disc 68 and the adjacent stationary structure of the valve. The size of these escape passages, as shown in FIG. 3, is exaggerated for purposes of clarity. As initially manufactured, there will be surface to surface contact with no gaps. However, after a period of use in the hostile atmosphere of the FIG. 1 system, various components forming chamber 80 can and normally will become distorted, warped and/or eroded by the flow therepast of hot gas and abrasive particulates. However, the enlargement of these escape passages can be compensated for by properly adjusting and increasing the flow of the purging gas introduced into chambers 80 from pipes 72 thereby virtually blocking and buffering all flow of process gas from the upstream to the downstream side of the closed valve to permit the safe insertion of the slip blind without shutting down the process unit. No fasteners are present anywhere in the valve assembly; therefore none can be ruptured by expansion stresses nor damaged from the eroding effects of the gas stream.

OPERATION

The operation of the invention when installed to recover energy from the flue gases emanating from one typical source, namely, a fluid catalytic cracking unit of a petroleum refining operation, will be evident from the foregoing description of the illustrative arrangement of the power recovery system shown in FIG. 1. The initial step is to supply fuel to the auxilliary burners 80 in steam generator 11 thereby to generate an adequate quantity of steam to drive turbine 51 and to provide purging steam for the butterfly valves then in closed position such as valves 34, 36 and 37. Alternatively, high pressure gas or steam may be supplied to steam main 50 from another source. When auxilliary burners 80 have generated adequate steam, turbine 51 is turned on to drive compressor 52 to provide pressurized air which is supplid through duct 54 to the air heater 18 and thence into the bed of catalyst present in the regenerator 15. Generator 12 is preferbly of the induction type and capable of functioning as a motor when supplied by energy from a power supply through the control panel 12' or as an electrical generator when driven at higher speed by expander 24. The control panel includes well known components operating automatically in response to change of speed to shift between motor and generator modes of operation. It will be understood that during this start up period the petroleum cracking unit forming no part of this operation is also being placed in operation and that spent catalytic agents requiring regeneration will be produced. These spent catalytic agents from the cracking unit will enter regenerator 13 through duct 15, and regenerated catalystic agents are returned in known manner to the cracking unit via duct 16.

Hot pressurized flue gases carrying large quantities of fine highly abrasive dust and particulates then pass through duct 19 into the third stage cyclonic separator 14 of a type well known in the art where major quantities of the particulate is separated and falls into the collection chamber at the bottom of this unit as the hot pressurized relatively clean flue gas exits. As these hot flue gases emanate from separator 14 the only path open is along ducts 28, and through open butterfly valve 35 into heat exchange with the steam generating portions of generator 11, and thence to stack 20 via the open butterfly valve 38. Valve 38 is normally open but when there is need for servicing generator 11 this valve is closed to safeguard against any possibility of backflow of carbon monoxide-laden stack gases into the generator 11 where they would pose a serious hazard to service personnel. During normal operation of generator 11, carbon monoxide present in the flue gases is converted to harmless carbon dioxide and then discharged into stack 20.

The large amount of heat present in the flue gases is thus utilized to generate steam at which time the fuel supply to the auxilliary burners 80 can be materially reduced or discontinued. The electrical generator 12 and expander 24 are rotating under no load at this time since these components are on the same shaft with compressor 52 and turbine 51. As these components approach full operation larger and larger volumes of flue gases are produced and this permits the operator to begin opening butterfly valves 34 and 36 while at the same time beginning to close valve 35 in synchronism therewith. This permits a larger and larger volume of flue gas to enter expander 24 to assume the driving load for compressor 52 while generator 12 continues to rotate under no load. As more and more flue gas is channeled through expander 24 the shaft 25 rotates at higher speed and governor 81 controlling the steam supply to turbine 51 responds thereto by automatically cutting off the steam to turbine 51 which then rotates in a free wheeling mode. It shall be understood that in some fluid catalytic cracking units the operator may elect to start up with flue gas routed directly through duct 23, through expander 24 and thence to the steam generator through duct 30. At this time butterfly valve 35 will be fully closed and valves 34 and 36 will be fully open. Expander 24 will normally have surplus power output in excess of that required to operate compressor 52 and this permits the generator 12 to be placed under load to supply energy to various other equipment around the facility. During start up, it can also operate as a motor to assist turbine 51 in driving the air compressor.

Should either the steam generator 11 or expander 24 require service for any reason, any of these units can be isolated from the flow of hot flue gases and taken out of operation for repairs or servicing without interfering with the operation of the fluid catalytic cracking unit. Thus, let it be assumed that expander 24 requires servicing. The operator begins closing valves 34 while at the same time opening valve 35 by power gradually supplied to their respective operating cylinders 34' and 35'. In this way the flow of flue gases is gradually diverted from expander 24 directly to the steam generator and to the stack by way of butterfly valve 35. After valve 34 is fully closed and valve 35 opened, then valve 36 may be closed to isolate the expander. As valves 34 and 36 reach closed position, pressurized fluid, such as steam from pipe 57, is admitted to the purging chamber 80 (FIG. 3), this steam being at a pressure higher than that prevailing on the upstream side of valve 34 and 35. This steam escapes past valve seat 78 and the rim of closure bar 76 of each of the valves 34 and 36. When valves 34 and 36 are fully closed expander 24 is effectively isolated from the flow of flue gas and the flanges on the inlet and outlet sides of the expander may be opneed to permit the installation of the slip blinds 44 and 46. Some steam or purging gas may be present, but this is non-toxic and non-flammable. The slip blinds 44 and 46 can then be securely bolted between the flanges 40 and 42 closest to valves 34 and 36. The expander is now isolated from the process and may be serviced at the next scheduled shutdown. The flue gas continues to flow through valve 35, generator 11 and valve 38 to stack 20.

After completion of the servicing operations expander 24 and the components connected therewith are returned to service by opening valves 34 and 36 and closing valve 35, the latter valve being slowly closed as valves 34 and 36 are gradually opened. It will be obvious from the foregoing that generator 11 can be taken out of service temporarily for repairs by a similar mode of diverting the continuing flow of flue gas past generator 11, by closing valves 34, 35, 36, 38 and opening valve 37.

While the particular method and system for recovering energy from hot pressurized waste gas herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A system for recovering energy from a continuous supply of particulate-laden hot pressurized flue gases emanating from such sources as blast furnaces, coal gasification and petroleum refining equipment comprising:

hot-gas-driven expander-power means;

flue gas disposal means;

first duct means connecting said source of flue gases to said gas disposal means via said expander-power means and including second duct means for bypassing said flue gases around said expander-power means and thence to said gas disposal means; and first and second high-temperature high-pressure purgable butterfly valve means in respective ones of said first and second duct means movable between open and closed positions and operable to route said hot pressurized gases selectively through one or the other of said first and second duct means at the operator's option thereby to maintain a substantially uninterrupted flow of gas from said source to said flue gas disposal means to permit servicing operations of said expander-power means safely without deactivating said source of flue gases; and said first purgable butterfly valve means including shaft-supported disc means rotatable to a closed position against a pair of parallel semi-annular non-overlapping valve seats projecting inwardly from the interior of said first duct means, the periphery of said disc means being L-shaped with the nonflexible radial leg thereof spaced closely to the interior of said first duct means and located on the remote side of said disc means from a respective one of said valve seats when said disc means is closed thereby to form an outwardly facing annular chamber, and means for supplying purging fluid to said annular chamber at a pressure higher than the pressure of said source of flue gases when said purgable valve means is closed.

2. An energy recovery system as defined in claim 1 characterized in the provision of means in said first and second duct means downstream from each of said first and second purgable valve means for securing slip blind means crosswise of a selected one of said duct means after the adjacent one of said purgable valve means has been closed thereby to relieve said closed purgable valve means from stress while servicing operations are being performed downstream from said slip blind means.

3. An energy recovery system as defined in claim 1 characterized in the provision of steam generator means located in said second duct means downstream from said second purgable valve means for generating steam from heat contained in said hot flue gases.

4. An energy recovery system as defined in claim 3 characterized in the provision of turbine-drivable aircompressor means powered by steam from said steam generator means.

5. An energy recovery system as defined in claim 3 characterized in the provision of a steam turbine connected to said steam generator means, and air compressor means coupled to said steam turbine and to said expander power means and adapted to be driven selectively by either one thereof as well as jointly by both.

6. An energy recovery system as defined in claim 5 characterized in the provision of governor controller steam valve means operatively connected to said steam turbine and automatically operable to close said steam valve means when said expander-power means reaches a predetermined speed whereby said expander-power means supplants said turbine in driving said air compressor.

7. An energy recovery system as defined in claim 4 characterized in the provision of means for conducting compressed air from said air compressor means to said continuous souce of hot flue gas to aid in the combustion of imcompletely combusted constituents therein.

8. An energy recovery system as defined in claim 4 characterized in the provision of means for conducting compressed air from said compressor means in heated pressurized condition into said source of hot pressurized flue gas.

9. An energy recovery system as defined in claim 4 characterized in the provision of induction generator means coupled to common drive shaft means interconnecting said expander-power means, said air compressor and said turbine, said induction generator means being connected to a source of dc power and being operable as a motor at lower speeds of said expander to aid said expander power means in driving said air compressor and operable as an electrical generator at the higher normal operating speeds of said expander power means.

10. An energy recovery system as defined in claim 3 characterized in the provision of pressurized fluid powered means for opening and closing said first and second purgable valve means.

11. An energy recovery system as defined in claim 1 characterized in that said source of hot pressurized flue gas comprises fluid catalytic cracking apparatus for regenerating spent catalyst material.

12. An energy ecovery system as defined in claim 1 characterized in the provision of separable joint means in said first duct means between said expander-power means and said first purgable valve means, and slip blind means securable to said first duct means after separation of said joint means and while said first purgable valve means is closed thereby to seal said first duct means and permit servicing said expander-power means.

* * * * *

UNITED STATES PATENT AND TRADEMARK OFFICE
CERTIFICATE OF CORRECTION

PATENT NO. : 4,453,323
DATED : June 12, 1984
INVENTOR(S) : Nicholas Nassir

It is certified that error appears in the above-identified patent and that said Letters Patent are hereby corrected as shown below:

Claim 9, Column 10, line 34, delete "dc".

Signed and Sealed this

Nineteenth Day of March 1985

[SEAL]

Attest:

DONALD J. QUIGG

*Attesting Officer*     *Acting Commissioner of Patents and Trademarks*